(12) United States Patent
Tang

(10) Patent No.: US 8,016,261 B2
(45) Date of Patent: Sep. 13, 2011

(54) SAFETY AIR VALVE OF A RECEIVING BAG

(75) Inventor: Wen-Chin Tang, Taipei Hsien (TW)

(73) Assignee: Highland Champ Corporation, Tortola (VG)

( * ) Notice: Subject to any disclaimer, the term of this patent is extended or adjusted under 35 U.S.C. 154(b) by 797 days.

(21) Appl. No.: 11/459,378

(22) Filed: Jul. 24, 2006

(65) Prior Publication Data

US 2008/0017818 A1    Jan. 24, 2008

(51) Int. Cl.
*F16K 31/44*    (2006.01)
(52) U.S. Cl. .......................... 251/82; 206/524.8; 141/65
(58) Field of Classification Search .................. 251/82; 206/524.8; 141/65; 202/203.29, 203.01, 202/202
See application file for complete search history.

(56) References Cited

U.S. PATENT DOCUMENTS

2003/0015452 A1*   1/2003   Su ............................. 206/524.8
2004/0232368 A1*   11/2004   Motonaka et al. ............ 251/100
* cited by examiner

*Primary Examiner* — John K Fristoe, Jr.
*Assistant Examiner* — Marina Tietjen
(74) *Attorney, Agent, or Firm* — Lowe Hauptman Ham & Berner LLP

(57) ABSTRACT

A safety air valve of a receiving bag includes an upper valve body, a valve seat and a valve gate. The upper valve body is installed inside the receiving bag. A first thread is formed at the protrusion stayed closely to the interior of the receiving bag. The first thread penetrates out the receiving bag; and a first main air channel is formed in the bottom of the first thread penetrating into the receiving bag so as to form a stepped valve opening on the top of the first main air channel. A second thread is formed at the valve seat corresponding to the first thread of the upper valve body. The second thread is screwed into the first thread and is positioned at the outer side of the receiving bag. The second thread has a press body corresponding to a first main air channel of the upper valve body.

2 Claims, 5 Drawing Sheets

SAFETY AIR VALVE OF A RECEIVING BAG

BACKGROUND OF THE INVENTION (a) Field of the Invention

The present invention relates to safety air valves of receiving bags, and in particular to improve the structure for applying a safety air valve of a receiving bag.

(b) Description of the Prior Art

A prior art of a clothing receiving bag services to store clothes available to exhaust the air in the bag so as to reduce storing volume of the bag. A vent valve is usually installed at the receiving bag. The simple embodiment of the vent valve is to form a thermal pressing vent gap on the selected edge of receiving bag. The vent gap services to exhaust the air in the bag by providing user extruding the bag. Besides, the other embodiment of vent valve is installed at a selected position to provide a vacuum cleaner tube to connect the sucking air valve so as to suck the air in the bag quickly.

The vent valve serving to connect vacuum cleaner tube usually has an air hole interlink the inner of the receiving bag. A valve gate is installed at the air hole for serving to open and close the hole. After the vacuum cleaner tube connecting to the air hole for sucking the air, the air is only sucked out of the bag continuously and cannot supply proper outside air. Therefore, when the air in the bag is sucked exhaustedly out, the motor of vacuum cleaner is easy to be broken down because of lacking cold air and over heating. Besides, if the inside of the receiving bag is in a vacuum state using the vacuum cleaner to suck out all of the air thereof, it is easy to cause clothing deteriorated and color fading after long-term storage.

SUMMARY OF THE INVENTION

The primary objective of the present invention is to provide a safety air valve of a receiving bag. A structure of a main air channel and a sub-air channel of the safety air valve of a receiving bag is improved. An upper valve body and a valve gate are used to be a mechanism for opening and closing a main air suck channel. A safety air valve is assembled to prevent from over sucking the air in the receiving bag so that proper residue air is used to protect a material in the receiving bag.

Thereby to achieve above object, the present invention provides a safety air valve of a receiving bag which comprises a upper valve body; wherein the upper valve body is installed at the inner side of the receiving bag; a first thread is formed at the protrusion stayed closely to the inner side of the receiving bag; the first thread penetrates out of the receiving bag; and a first main air channel is formed at the bottom of the first thread penetrating into the receiving bag so as to form a stepped valve opening on the top of the first main air channel; a valve seat; wherein a second thread is formed at the valve seat corresponding to the first thread of the upper valve body; the second thread is screwed on the first thread and is positioned outer the receiving bag; the second thread has a press body corresponding to a first main air channel of the upper valve body; the press body has a second main air channel penetrating through to the outsider of the receiving bag; and a sub-air channel is formed at one side of the valve seat so as to interlink the second main air channel; and a valve gate; wherein the valve gate is covered between the upper first main air channel and the press body; a plurality of notches are formed around the valve gate so as to circulate air; and a safety air valve is assembled to prevent from over-sucking the air in the receiving bag.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
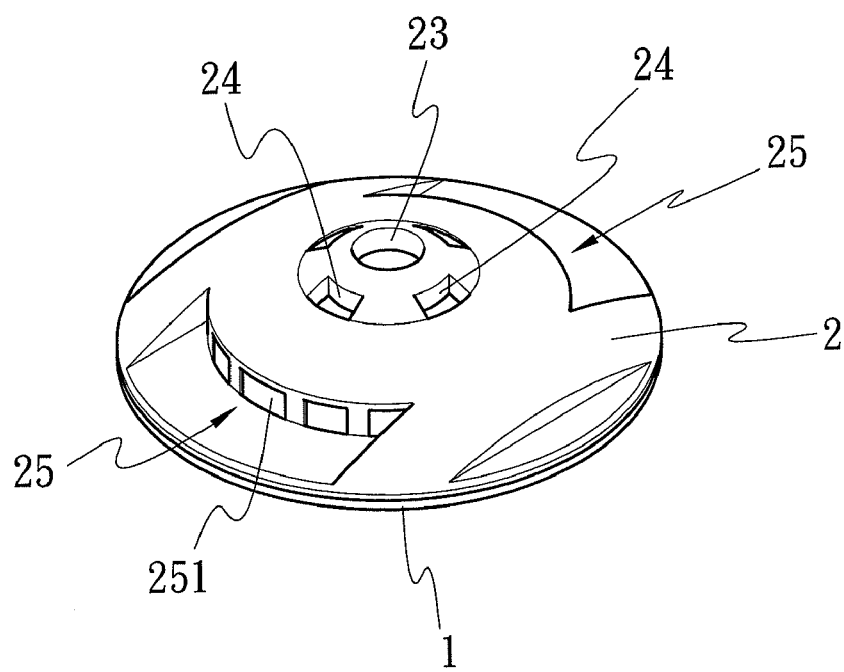
FIG. 1 is an assembled perspective view of the present invention.
Figure 5:
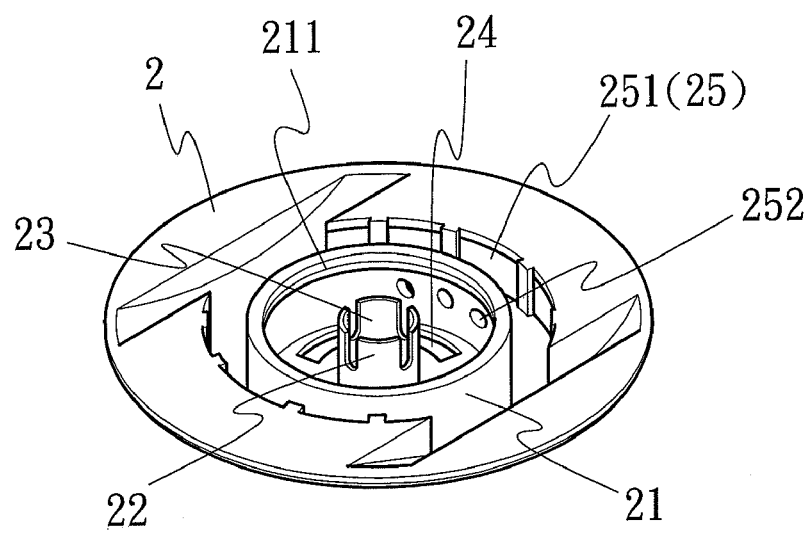
FIG. 5 is a perspective view of the valve seat of the present invention.
Figure 2:
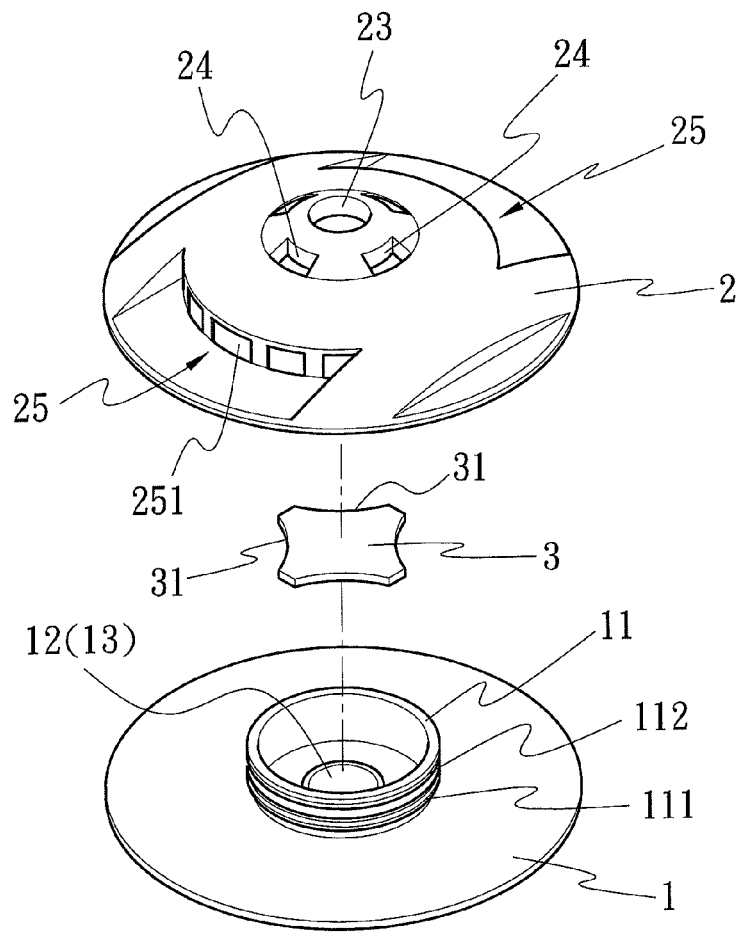
FIG. 2 is a disassembled perspective view of the present invention.
Figure 3:
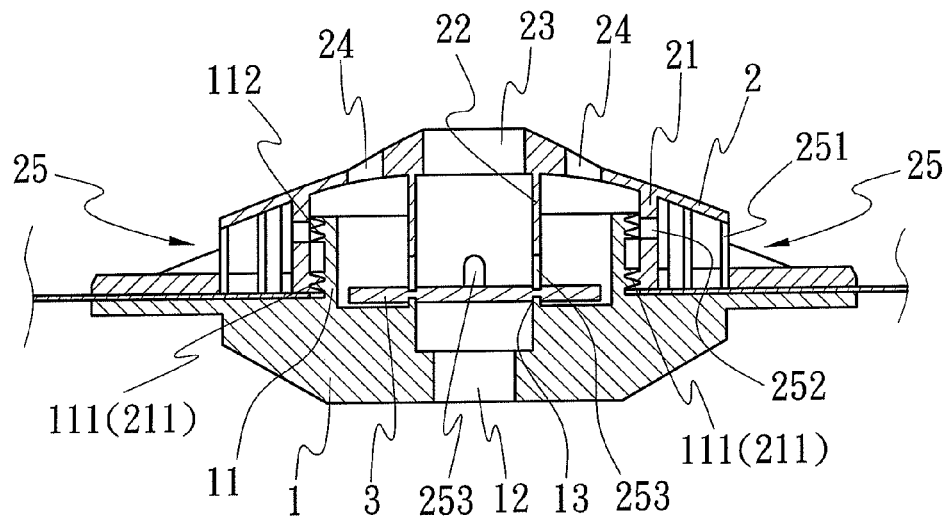
FIG. 3 is a cross-sectional view of the present invention.
Figure 4:
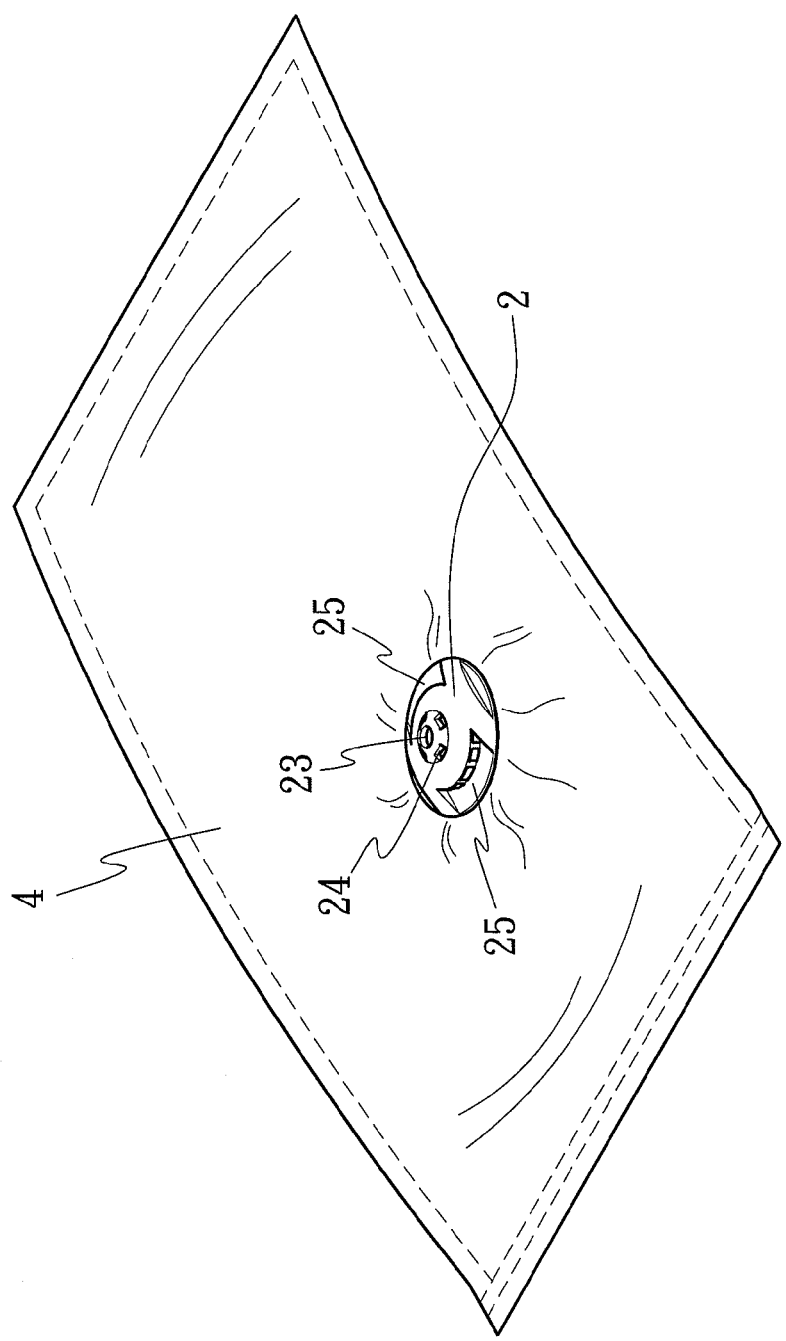
FIG. 4 is an applied embodiment of the present invention.

A hollow second thread 12, referring to FIGS. 2, 3 and 5, is installed at the inner side of the valve seat 2 so as to match up the annular sheet on the upper valve body 1. The inner side of the second thread 21 is formed inner threads 211 so as to buckle the first thread 11 on the upper valve body 1 and position outer of the receiving bag 4. A press body 22 is protruded on the middle of the second thread 21 corresponding to first main air channel 12. The press body 22 on the central and by the side thereof have respectively a main air channel 23 and 24 so as to penetrate through the outsider. Beside, the outside of the valve seat 2 has at least one of the sub-air channels 25 so as to interlink the two main air channel 23 and 24. The sub-air channels 25 can be a plurality of gated air channels 251 formed on the two side of the valve seat 2. The second thread 21 is formed a plurality of radial through holes 252. The lateral end of the press body 22 has a plurality of slots 253 so as to interlink the two main air channel 23 and 24.

The valve gate 3, referring to FIGS. 2 and 3, is covered on the sheet between stepped valve opening 13 and press body 22 of the first main air channel 12. The diameter of the valve gate 3 is smaller than the diameter of the first thread 11. Besides, around the circle of the valve gate 3 is available to have a plurality of notches 31 so as to circulate air thereof. Thereby, the safety air suck valve is assembled so as to provide outer air by sub-air channel 25 properly, whiling the vacuum cleaner tube 5 sucks the air of inner the receiving bag 4 by the main air channel 12, 23, 24 so as to prevent from a motor overheating because of the vacuum cleaner over sucking air. Thereby, proper volume air is kept in the receiving bag 1 so as to protect a material in the receiving bag 4.

Figure 6:
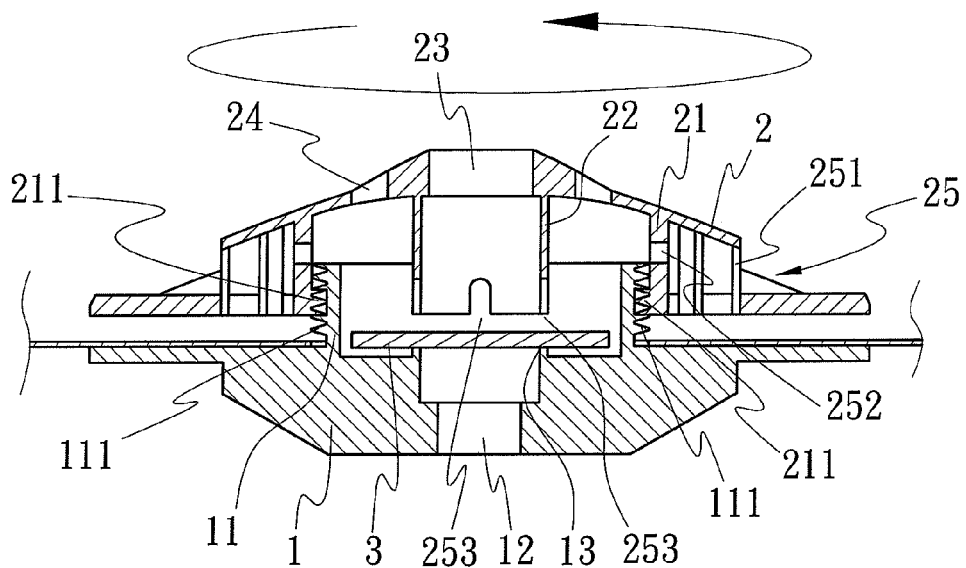
FIG. 6 is a perspective view of the first applied embodiment movement of the present invention.
Figure 7:
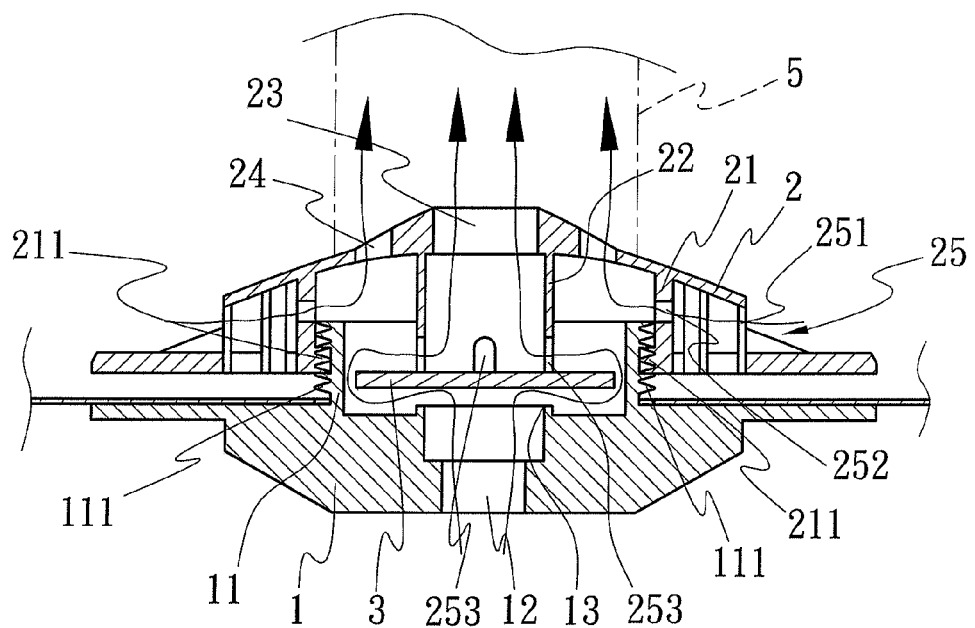
FIG. 7 is a perspective view of the second applied embodiment movement of the present invention.
Figure 8:
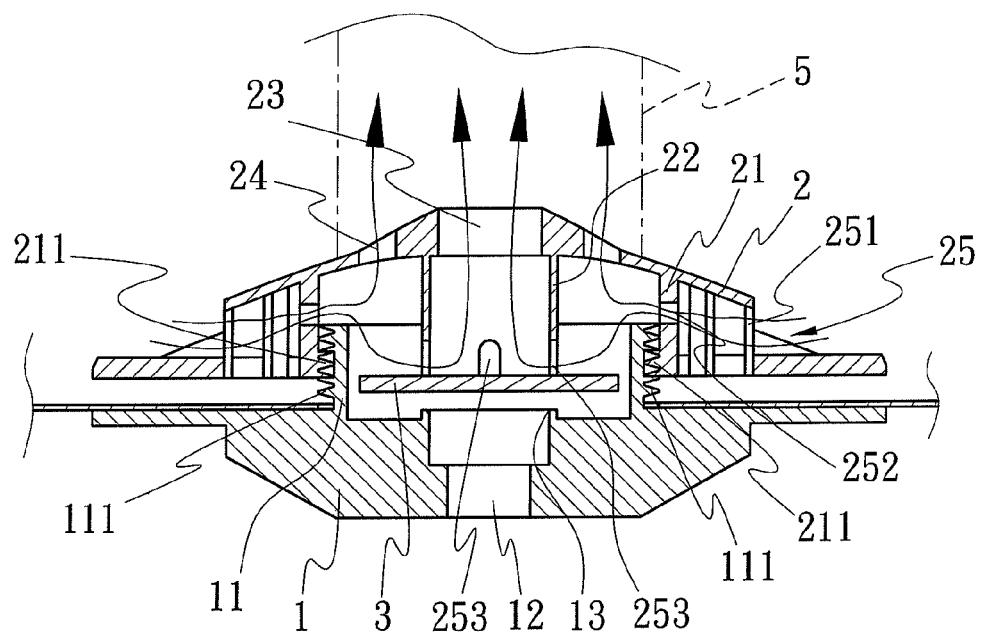
FIG. 8 is a perspective view of the third applied embodiment movement of the present invention.
Figure 9:
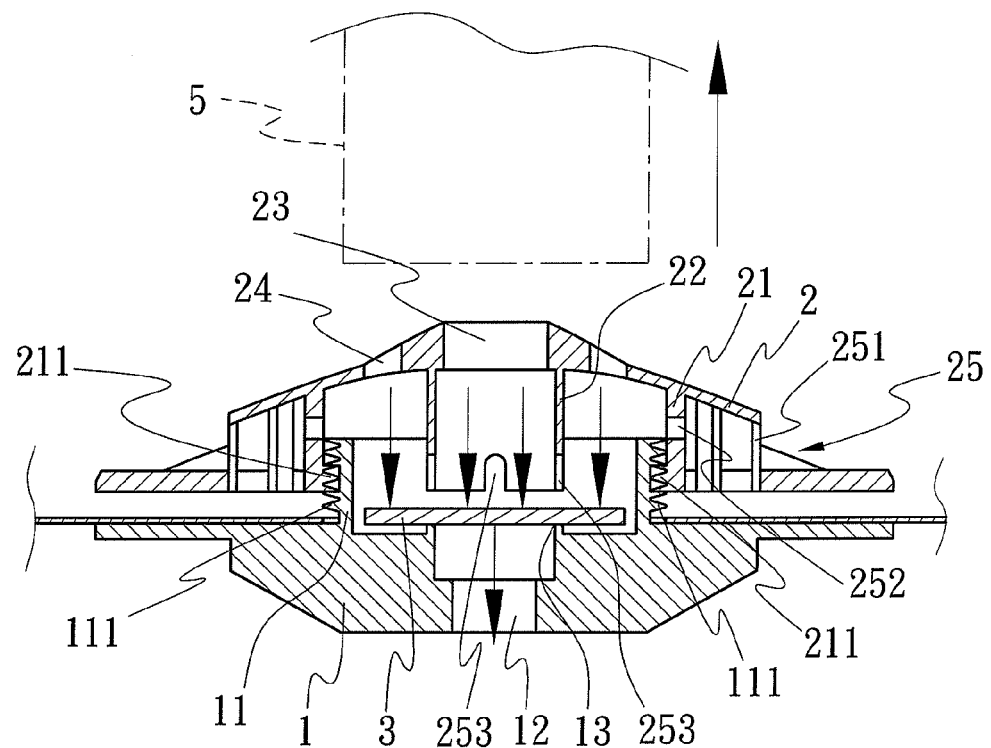
FIG. 9 is a perspective view of the fourth applied embodiment movement of the present invention.

The applied embodiment of the present invention is illustrated to the FIG. 6. The valve seat 2 is screwed upwards so that the inner threads 211 of the second thread 21 is separated to the outer thread 111 of first thread 11 of the upper valve body 1. Whiling the press body 22 is elevated upwards to separate the valve gate 3 so as to be a floating state of the valve gate 3. Therefore, referring to FIG. 7, the vacuum cleaner tube 5 is not only hooded on the second main air channel 23 and 24 of the valve gate 3, but also the vacuum cleaner is opened to suck the air in the receiving bag 1. The air is sucked out through the first main air channel 12 and the second main air channel after pushing to the valve gate 3. When the air is almost exhausted or exhausted (referring to FIG. 8), air on the outside of the receiving bag 4 is sucked into the receiving bag 4 by using the structure of the sub-air channel 25 (e.g. the gated air channel 251, the radial through hole 252 and slots 253) of the valve seat 2. The safety air valve of a receiving bag is available to prevent from overheating motor broken because air is over sucked out the receiving bag 4 so as to maintain the function of the vacuum cleaner. Besides, when the air is sucked out of the receiving bag 4 contracted to be proper, the valve seat 2 is available to be screwed (referring to FIG. 9) so that the inner threads 211 of the second thread 21 is buckled with the outer thread 111 of the first thread 11 of the upper valve body 1. Besides, the vacuum cleaner tube 5 is available to be remove by using that the press body 22 pushes downwards valve gate 3 staying close to the top of the first main air channel 12 (referring to FIG. 3). Because the present invention has the sub-air channel 25 so as to supply air to the vacuum cleaner, the air in the receiving bag 4 is available to prevent from over sucking. Thereby, any material in the receiving bag 4 is available to be protected and prevent from thereof going bad (such as clothing or the other material).

Besides, the first thread 11 has two circles of unconnected outer thread 111 and 112. After a user screws upwards the valve seat 2 reaching to the inner threads 211 of the second thread 21 and separate to the outer thread 111, the valve seat 2 does not match up immediately to the upper outer thread 112 so that the valve seat 2 becomes a idly rotating without rising state. Thereby, the user knows in advance that the valve seat 2 has already been opened properly so as to prevent from that the valve seat 2 is rotated completely to separate the upper valve body 1.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. The safety air valve of a receiving bag comprising:
   an upper valve body; wherein the upper valve body is installed at the inner side of the receiving bag; a press body; and a first helical thread formed on an upwardly extending portion of the upper valve body closely to the inner side of the receiving bag; wherein the first helical thread defines a passageway extending out of the receiving bag; and a first main air channel is formed at the bottom of the first thread penetrating into the receiving bag so as to form a stepped valve opening on the top of the first main air channel;
   a valve seat having two sides including an outer side; wherein a second helical thread is formed on the upper valve seat corresponding to the first helical thread of the upper valve body; the second helical thread is screwed on the first thread and is positioned outside of the receiving bag; the second helical thread engages the first helical thread on the upper valve body and corresponds to a first main air channel of the upper valve body; the press body has a second main air channel penetrating through to the outside of the receiving bag; and a sub-air channel is formed at one side of the valve seat so as to interlink the second main air channel;
   a valve gate; wherein the valve gate is covered between the upper first main air channel and the press body; a plurality of notches are formed around the valve gate so as to circulate air; and the safety air valve is assembled to prevent from over-sucking the air in the receiving bag; and
   wherein the sub-air channel includes a plurality of gated air channels on the outer side of the valve seat; the second thread has a plurality of radial through holes; and the end of the press body has a plurality of slots.

2. The safety air valve of a receiving bag comprising:
   an upper valve body; wherein the upper valve body is installed at the inner side of the receiving bag; a press body; and a first helical thread formed on an upwardly extending portion of the upper valve body closely to the inner side of the receiving bag; wherein the first helical thread defines a passageway extending out of the receiving bag; and a first main air channel is formed at the bottom of the first thread penetrating into the receiving bag so as to form a stepped valve opening on the top of the first main air channel;
   a valve seat having two sides including an outer side; wherein a second helical thread is formed at the upper valve seat corresponding to the first helical thread of the upper valve body; the second helical thread is screwed on the first thread and is positioned outside of the receiving bag; the second helical thread engages the first helical thread on the upper valve body and corresponds to a first main air channel of the upper valve body; the press body has a second main air channel penetrating through to the outside of the receiving bag; and a sub-air channel is formed at one side of the valve seat so as to interlink the second main air channel;
   a valve gate; wherein the valve gate is covered between the upper first main air channel and the press body; a plurality of notches are formed around the valve gate so as to circulate air; and the safety air valve is assembled to prevent from over-sucking the air in the receiving bag;
   wherein the valve seat includes a sub-air channel on the two sides of the valve seat interlinking the second main air channel; and
   wherein the sub-air channel includes a plurality of gated air channels on the outer side of the valve seat; the second thread has a plurality of radial through holes; and the end of the press body has a plurality of slots.

* * * * *